UNITED STATES PATENT OFFICE.

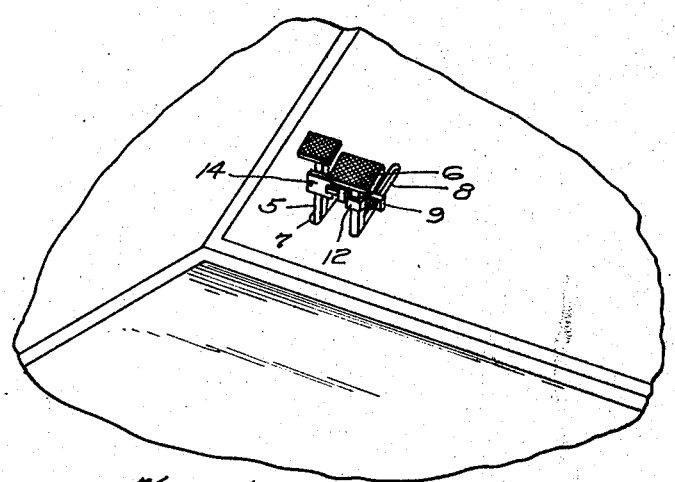
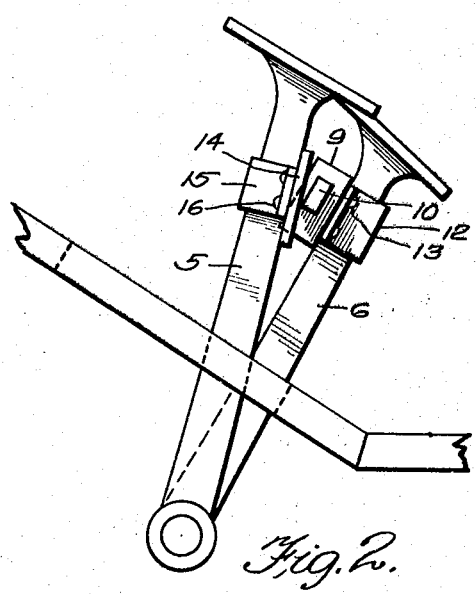
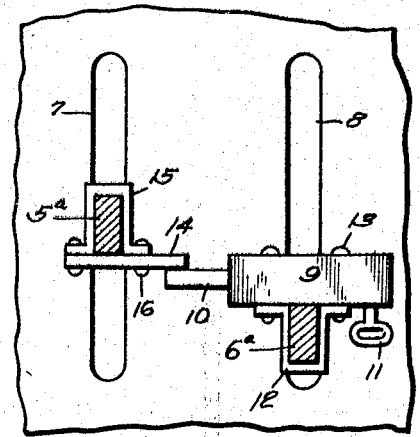

EDWIN C. BOEHMIG, OF HAMMOND, INDIANA.

LOCK FOR AUTOMOBILES.

1,327,979.                Specification of Letters Patent.        Patented Jan. 13, 1920.

Application filed March 27, 1919. Serial No. 285,688.

*To all whom it may concern:*

Be it known that I, EDWIN C. BOEHMIG, a citizen of the United States of America, residing at 1002 Park Place, Hammond, in the county of Lake and State of Indiana, have invented certain new and useful Improvements in Locks for Automobiles, of which the following is a specification.

This invention relates to locks for automobiles and it has for its object the provision of an improved device of this character constructed in such manner that it may be manufactured at a very small cost, will be capable of easy attachment, will not be unsightly in use, will be capable of being locked or unlocked very easily and will employ a lock of standard construction, thereby avoiding the expense incident to the use of a lock of special construction.

With the foregoing objects in view I utilize a standard key controlled lock of the bolt type and rigidly attach this lock to the brake pedal of an automobile in such position that the bolt thereof may be shot into the path of movement of the clutch pedal after the latter has been shoved forward to disengage the clutch, with the result that the clutch will be held in inoperative position and the car may not be operated until the bolt of the lock is retracted.

In the accompanying drawings in which I have illustrated one embodiment of the invention for purposes of explanation;

Figure 1 is a perspective view illustrating the clutch and brake pedals of an automobile having the invention applied thereto.

Fig. 2 is an enlarged side elevation of the same, and

Fig. 3 is a plan view with the pedals in section.

Like numerals designate corresponding parts in all of the figures of the drawing.

Referring to the drawing, 5 designates the clutch pedal and 6 the brake pedal of an automobile, these pedals operating in the slots 7 and 8 in the usual and well known way. A lock 9 having a bolt 10 that is operable by means of a key 11 is secured to the shank $6^a$ of the brake pedal by means of a clip 12 which embraces the shank $6^a$ and is secured to the body of the lock by rivets or other suitable fastenings 13. The bolt 10 may be shot into the path of movement of a stop plate 14 that is secured by a clip 15 and rivets 16 to the shank $5^a$ of the pedal 5. It is manifest that the bolt 10 may be made long enough to extend into the path of movement of the shank $5^a$ to thereby render it unnecessary to employ a stop plate 14. This stop plate has been illustrated merely to divide the distance between the two pedals so that neither of the elements 10 or 14 need be abnormally long. It is also apparent that the positions of the parts may be reversed; that is, the lock may be carried by the clutch pedal and engage the brake pedal or it may be carried by the brake pedal and engage the clutch pedal.

I am aware of the fact that locks for automobiles have been heretofore proposed. However, all of these locks with which I am familiar are more or less complicated, cumbersome and expensive. The present invention provides a lock which is always in place and consequently does not have to be separately applied each time the owner leaves the car, may be quickly locked or released, will cost but little to manufacture because a standard type of lock may be utilized, has no parts that will rattle and become noisy in use while, at the same time, it will serve to positively disconnect the engine and driving wheels and consequently will effectually prevent the theft of the car.

While the elements shown and described are well adapted to serve the purposes for which they are intended it is to be understood that the invention is not limited to the precise construction set forth but that it includes within its purview whatever changes fairly come within the spirit of the appended claims.

Having described my invention, what I claim is:

1. In a device of the character described the combination with the clutch and brake pedals of an automobile of a lock having a key controlled bolt, means for securing the same rigidly to one of said pedals and an element carried by the other of said pedals into the path of movement of which said bolt may be projected, to thereby hold the clutch in disengaged position.

2. In a device of the character described the combination with the clutch and brake pedals of an automobile of a lock having a longitudinally movable bolt means for mounting said lock rigidly upon one of said pedals, an element carried by the other of said pedals into the path of movement of which the said bolt may be projected, the body of the lock projecting a sufficient distance beyond the pedal by which it is carried at that side of the pedal remote from the bolt to permit the insertion of a key in the lock at that side of said pedal.

In testimony whereof I affix my signature.

EDWIN C. BOEHMIG.